2 Sheets—Sheet 1.

J. H. JONES.
SEEDING-MACHINES.

No. 183,682. Patented Oct. 24, 1876.

WITNESSES
Wm A Hinkle
Baltis D. Long

INVENTOR
J Herva Jones
By his Attorneys,
Baldwin Hopkins & Peyton

N. PETERS, PHOTO-LITHOGRAPHER, WASHINGTON, D. C.

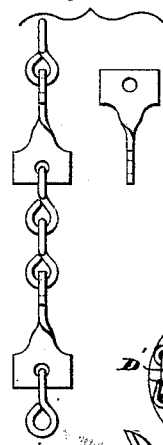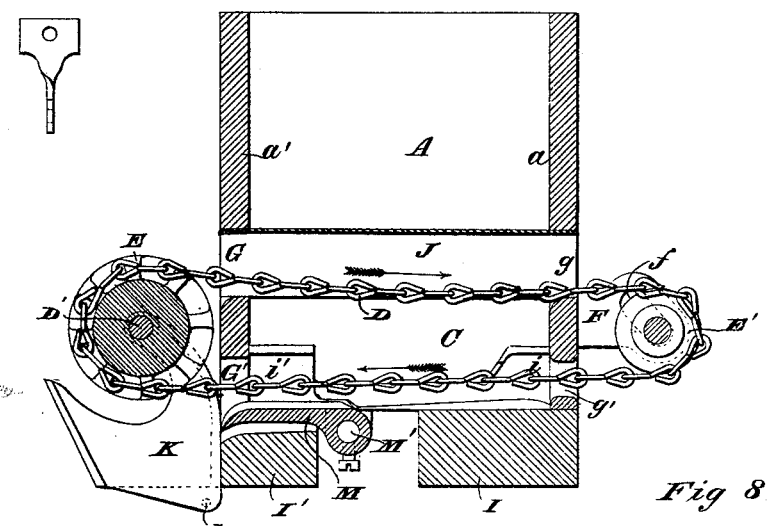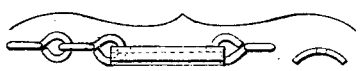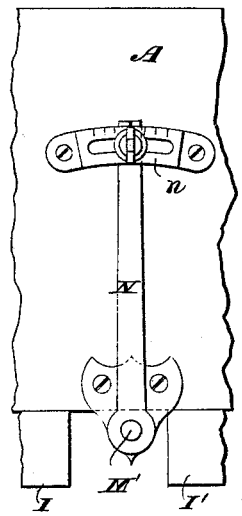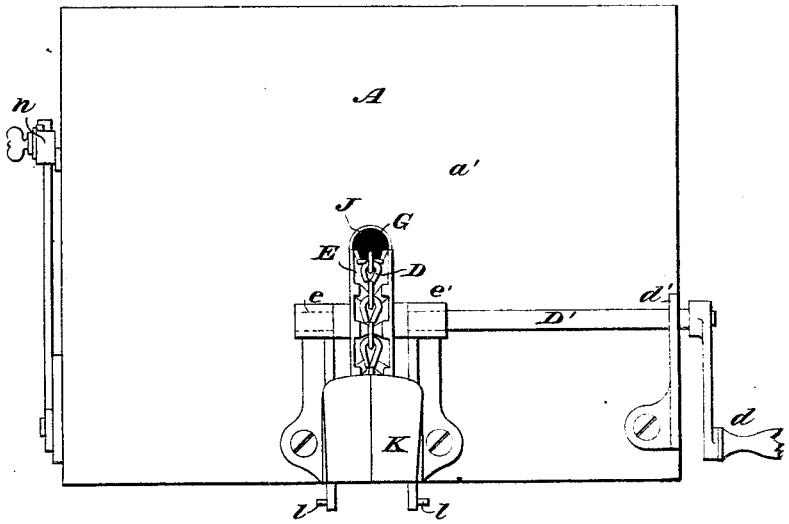

UNITED STATES PATENT OFFICE.

JAMES HERVA JONES, OF ROCKFORD, ILLINOIS, ASSIGNOR TO RALPH EMERSON AND WILLIAM A. TALCOTT, OF SAME PLACE.

IMPROVEMENT IN SEEDING-MACHINES.

Specification forming part of Letters Patent No. 183,682, dated October 24, 1876; application filed October 7, 1876.

*To all whom it may concern:*

Be it known that I, JAMES HERVA JONES, of Rockford, in the county of Winnebago and State of Illinois, have invented certain new and useful Improvements in Seeding-Machines, of which the following is a specification:

My invention relates to machines of that class known as "force-feed seeders." Its objects are to discharge the grain from the seed box or hopper in a continuous stream, and in regulated quantities; automatically to adjust the feed mechanism to compensate wear in its working parts; to prevent waste of grain, or its escape except through the feed-tubes; to prevent the clogging of the grain, or its entanglement with the stirring mechanism; to provide means whereby the operator can always ascertain whether the feed mechanism is working properly, and whether the seed is being properly fed from the hopper; and, finally, to improve the details of the mechanism. These ends I attain by the novel organization of mechanism hereinafter fully described.

The subject-matter claimed will hereinafter specifically be designated.

The accompanying drawings represent so much only of a portion of a fully-organized seeding-machine, embodying all my improvements, as is necessary to illustrate the subject-matter claimed. The invention will, of course, however, be used on a fully-organized seeder of approved well-known construction, which needs no description here. Some of my improvements, obviously, however, may be used without the others, and in machines differing somewhat in their details of construction from that therein shown and herein described.

The drawings represent one section or compartment only of the seeder-hopper with my improvements adapted thereto; but in practice a complete hopper will be, of course, employed, and is, ordinarily, provided with from three to twelve such compartments, each having the various parts for feeding, &c., adapted thereto, in a manner similar to that shown; but as such parts would be a mere duplication of those shown, their representation is unnecessary to an understanding of the invention.

Figure 1:
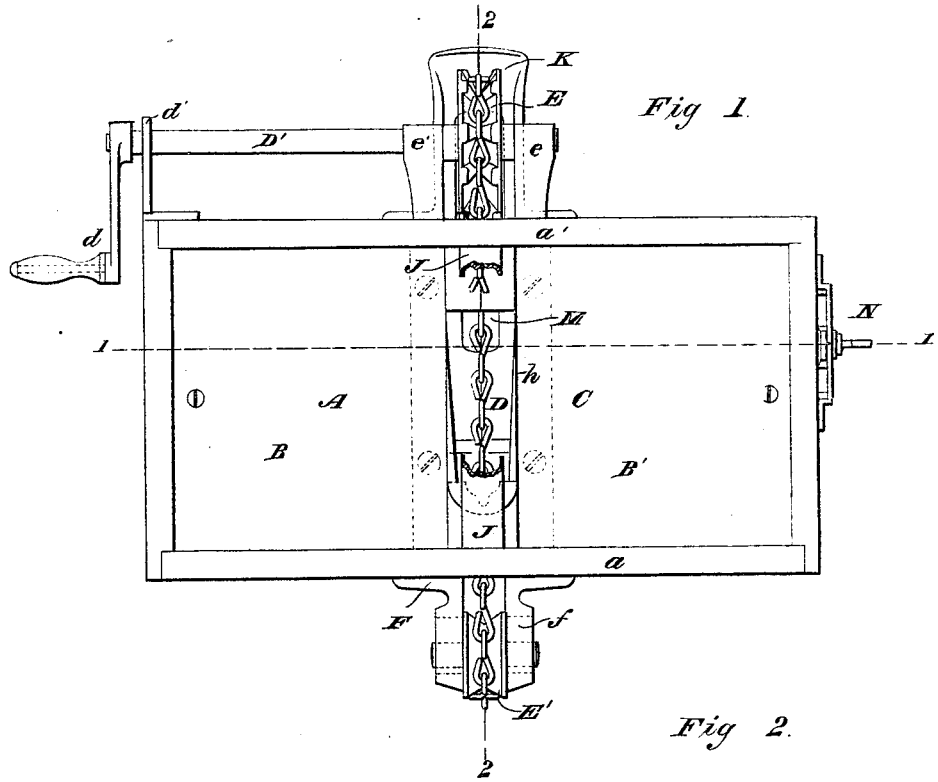
Figure 2:
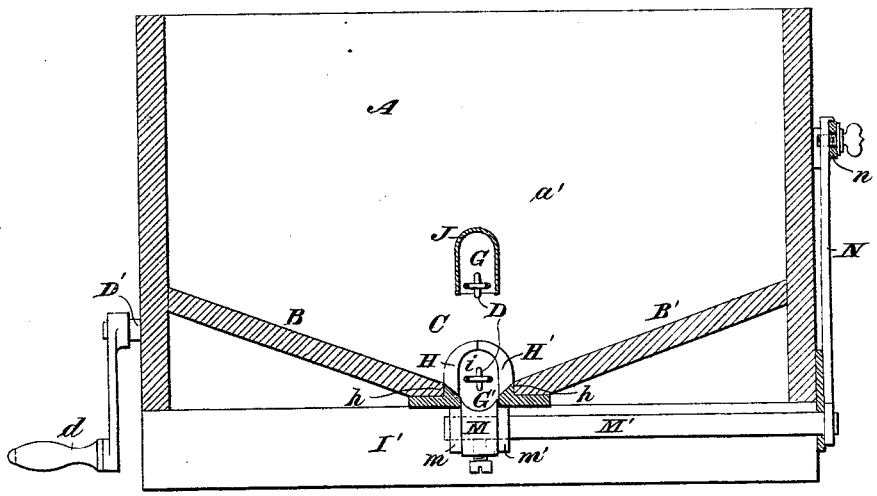

Figure 1 represents a plan or top view of the apparatus with a portion of the cover, or protected passage in which the upper portion of the feed-chain works, broken away to show the chain more clearly. Fig. 2 represents a vertical longitudinal section therethrough on the line 1 1 of Fig. 1. Fig. 3 represents a vertical transverse section therethrough on the line 2 2 of Fig. 1. Fig. 4 represents a rear elevation; and Fig. 5 an end elevation of the apparatus; and Figs. 6, 7, and 8 show portions of feed-chains of different forms, the chains being provided at intervals with solid or plate links.

The feed box or hopper A is constructed, as usual, with inclined or upright sides $a$ $a'$ and bottom inclines B B', thus forming a centrally-depressed trough or compartment, C, running from front to rear of the hopper.

An endless chain, D, runs transversely, or from front to rear, through the hopper over the depressed compartment or trough C, being carried by a shaft, D', driven in usual well-known ways. In the drawings this shaft is shown, for the sake of illustration merely, as driven by a hand-crank, $d$. The shaft D' is represented, in this instance, as mounted in bearings in a bracket, $d'$, and in short arms or lugs $e$ $e'$, formed upon the receiver or distributer secured to the rear of the hopper, from which hopper the grain drops into the distributer.

The feed-chain passes at its opposite ends around a driving or sprocket wheel, E, on the shaft D', and a driven pulley, E', the shaft of which revolves in slots in a two-part bracket, F, on the front side $a$ of the hopper. The shaft of the driven pulley E' is movable in its bearings, in order that the weight or gravity of the pulley may keep the driven chain taut; and the slots $f$, in which this pulley revolves and traverses, are, by preference, inclined downward and outward at an angle, say, of forty-five degrees, so that the shaft of the pulley E' may recede from the driving-wheel E as it descends in its slots, and thus take up the slack of the chain, thus having an automatic compensation for wear. Not only does the weight of the driven pulley E′ constantly tend to force it downward, and thus increase its distance from the driving-wheel E, but the direction of rotation of the pulley E′ is such that the tendency is to roll in a corresponding direction, its shaft bearing upon the lower surfaces of the slots in the two-part bracket, and thus tend to keep the driven chain taut by friction as well as by gravity, and yet at the same time allow it to yield to any undue strain.

The chain passes from the sprocket-wheel E through openings G G′ in the back $a'$ of the hopper, thence across the hopper and through corresponding openings $g\ g'$ in the front $a$ of the hopper, and around the pulley E′.

The lower portion of the chain, it will be observed, works upon or close to the bottom of the trough or depressed compartment C. A trough-like way is, by preference, provided for the chain to work in. This trough, if desired, may be made in one piece, but is preferably composed of two equal parts or longitudinal sections, H H′, the adjacent edges of which abut against each other. These sections, H H′ are alike, and each is provided with a shoulder or flange, $h$, against which the lower ends of the bottom inclines B B′ abut, while that portion of each plate or section outside of and below these shoulders affords a rest for supporting the lower end of the incline adjacent thereto. (See Fig. 2.)

The plates H H′ are secured upon the ordinary longitudinal pieces I I′, beneath the hopper, and at each end form passages $i\ i'$, completely inclosing the chain near the front and back sides of the hopper, leaving an open space between for the entrance of the grain. The rear tubular way $i'$ thus serves to conduct the grain to the discharge-opening G′, through which the grain is carried by the lower portion of the chain in its backward traverse through the hopper, while the front way $i$ serves to prevent the grain, when the chain is at rest, from escaping at the lower front opening $g'$ through which the chain enters.

The upper chain-openings $g$ G, in the front and back of the hopper, respectively, receive the ends of a cover or protector, J, for the upper portion of the chain. The cover is shown in the drawings, as made of an arch or inverted trough-shape form, which I prefer to that of the closed tube, for the reasons which will hereinafter be explained.

Between the lower sides of this covered passage J the upper portion of the chain works on its return through the hopper from the opening G in its back to the front opening $g$. The chain sags or drops slightly between the front and rear sides of the hopper, and I utilize this sagging not only to prevent the grain entering the open bottom of the arched passage from below, and from becoming entangled with and carried out by the chain through the opening in the front of the hopper, but to stir and agitate the grain immediately over the lower portion of the chain, and to prevent any arching or clogging of straw, chaff, &c., that may be in the grain over the lower portion of the chain.

When at rest, the chain, which, it will be observed, works upon or close to the lower portions of the openings G $g$, prevents the escape of the grain from the hopper through these openings, while the passages $i\ i'$ and the lower part of the chain prevent its escape at the openings G′ $g'$.

I have described the chain as working from front to rear of the hopper, but the apparatus might be reversed so that the discharge should take place at the front instead of the rear.

An open-bottom receiver, K, is preferably made in two sections, and formed, as hereinbefore described, with perforated arms $e\ e'$ to support the driving-shaft D′, having a sprocket or driving wheel, E, secured upon it between said arms. This wheel E, it will be seen, is located above and between the sides of the receiver, the front of which is closed by the back of the hopper. The receiver extends below and on each side of the discharge-orifice G′, is open both at top and bottom, and is made somewhat in the form of a boot or shoe heel. I, therefore, term it the "open heel" receiver. The grain, as it is fed from the hopper, is dropped into the receiver, and is distributed to any suitable scatterer or feed-tube, such, for instance, as that shown in Letters Patent of the United States No. 153,198, granted to my assignees July 21, 1874. The grain may pass to the scatterer, if preferred, by way of a feed-tube hinged to stud-pins $l\ l'$ on the heel.

The feed may be increased or diminished at will by any suitable regulator for changing the area of the discharge-openings. I prefer to effect this change by means of a pivoted vertically-rocking spout like conveyer M, which, in this instance, is removably and adjustably secured at its inner ends to a rod or shaft, $m'$, between lugs $m\ m'$ formed upon the bottom of the plates or sections H H′, or upon the opposite side of the center of a single plate, when one only is used to answer the purpose of the two hereinbefore described.

The regulator works singly in a longitudinal slot in these plates. The shaft M′ rocks in its bearings in the lugs $m\ m'$, and is controlled by a lever, N, at one end of the hopper, said lever being provided at its upper end with a suitable graduated gage, $n$, and a clamp-screw, or other suitable device, for holding the lever in the position desired to enable the operator to gage the discharge.

In operation, the seed or grain is fed continuously by the chain to the open-heel receiver and distributer. The driver or conductor, who walks behind the machine, is enabled by the construction of the receivers to see beneath the chain and driving-wheels into the receivers, and observe the flow of the seed from the hopper at each discharge-opening. The chain-driving wheel is, in practice, connected with its shaft, so as to revolve therewith by means of a wooden break-pin, or other frangible connection which gives way, so as to allow the shaft to turn in the wheel in the event of undue strain on the feed-chain, caused by the clogging of the seed or otherwise. I also employ gearing for imparting motion to the chain-driving shaft, by which means its speed may be varied to increase or diminish the amount of seed discharged in a given time.

I have found, in practice, the chain to be very effective in preventing the clogging of the seed and insuring its delivery in uniform quantities. The tension device keeps the chain taut, and compensates wear and yields to undue strain, and the driving mechanism, being outside of the hopper, is readily accessible for purposes of removal, replacement, inspection, adjustment, and repair.

The chain, on its return path, might be carried outside of the hopper or above the level of the seed, or in a closed passage-way, if desired; but I prefer the construction shown. I also prefer to use a chain of corresponding construction throughout, but have found that alternate plate-links and chain-links, such, for instance, as shown in Figs. 6, 7, and 8, answer well for an endless-chain force-feed.

I claim as of my own invention—

1. A force-feed consisting of an endless chain working transversely through a hopper, substantially as hereinbefore set forth.

2. The combination, substantially as hereinbefore set forth, of a seed box or hopper, an endless feed-chain traversing said hopper transversely, and a driving-wheel, around which the chain passes outside the hopper.

3. The combination, substantially as hereinbefore set forth, of a seed box or hopper, a driving-wheel, and an endless feed-chain passing through openings both in front and rear of the hopper.

4. The combination of a hopper, an endless feed-chain working through it, and a regulator for adjusting the area of the discharge-opening.

5. The combination of a hopper, an endless feed-chain working through an opening therein, a regulator for adjusting the area of the discharge-opening, a rock-shaft on which said regulator is mounted, and a gage-clamp indicating the rate of feed.

6. The combination of a hopper, a driving-wheel, a self-adjusting gravity tension-pulley, and an endless feed-chain passing through the hopper.

7. The combination of the hopper, the driving-wheel, the endless feed-chain, the tension-pulley, the bracket and its downwardly and outwardly inclined slots, in which the shaft of the tension-pulley has its bearings, whereby both friction and gravity co-operate in producing tension on the driving-chain.

8. The combination of a hopper, an endless feed-chain passing through said hopper in both directions, and an archway or passage for the upper portion of the chain.

9. The open-heel receiver, constructed substantially as hereinbefore set forth, with an open top and bottom and with lugs to receive the driving-shaft, and adapted to be secured to the side of the hopper beneath the chain-driving wheel, to receive and afford a view of the seed discharged from the hopper, as set forth.

10. The combination of the hopper, the open-heel receiver secured thereto, its lugs, the driving-shaft mounted in the lugs, the driving-wheel mounted on the shaft between the lugs and the endless feed-chain.

11. The chain trough or way, constructed, substantially as set forth, with an open middle portion and tubular ends, whereby a free discharge is secured, while waste is prevented when the chain is at rest.

12. The combination of the hopper-walls, its bottom inclines, and the chain-trough, having shoulders against which the inclines abut, and supporting-surfaces on which they rest at their lower ends.

13. The combination of the hopper, the chain-trough, the feed-regulator, the open-heel receiver, the driving-wheel, and the chain.

14. The combination, substantially as hereinbefore set forth, of a hopper, a driving-wheel, a tension-pulley, an endless feed-chain passing over said wheel and pulley and through the hopper, and an open-heel receiver.

15. A seeding-machine hopper, constructed substantially as hereinbefore set forth, with openings in front and rear communicating with a trough, through which a chain passes in one direction, and a passage-way above it, through which the upper portion of the chain passes.

In testimony whereof I have hereunto subscribed my name.

J. HERVA JONES.

Witnesses:
E. H. THOMPSON,
JOHN SEGUS.